Patented May 24, 1927.

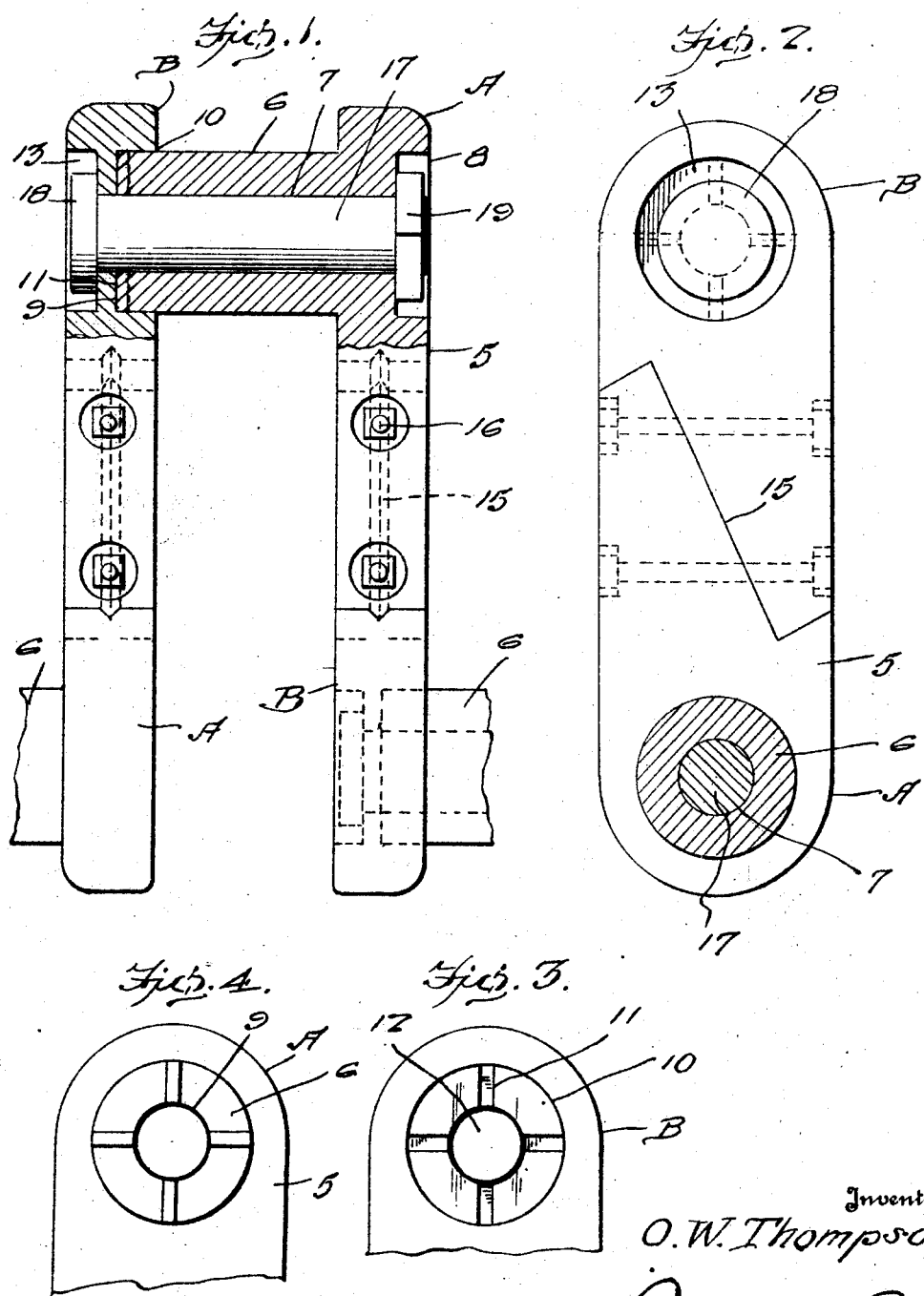

1,630,038

UNITED STATES PATENT OFFICE.

OLE W. THOMPSON, OF DURKEE, OREGON.

CRANK SHAFT.

Application filed April 29, 1925. Serial No. 26,698.

The present invention relates to a crank shaft and aims to provide a structure formed from a plurality of detachable sections for the purpose of allowing roller bearings to be used in conjunction with the bearing portions thereof.

Another important object of the invention is to provide a crank shaft of this nature having a strong and durable knock-down structure, which is capable of being easily and readily disassembled and assembled, not likely to readily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary elevation of a crank shaft embodying the features of my invention showing one of the bearing portions in section.

Figure 2 is a transverse section through the crank shaft.

Figure 3 is a detail elevation of one end of one of the sections, and

Figure 4 is an end elevation of one of the bearing portions.

Referring to the drawing in detail, it will be seen that the crank shaft includes a plurality of sections A and sections B. Each section A includes an arm portion 5, and a bearing portion 6. The bearing portion is provided with a longitudinally extending bore 7 which is continued through the arm portion 5 terminating in a recess 8. The end of the bearing portion 6 is provided with a plurality of ribs 9, as is clearly shown in Figure 4.

The section B is provided with an annular recess 10, the inner wall of which is provided with a plurality of radiating grooves 11 disposed about the opening 12. The recess 10 is on the inner face of the section B and a similar recess 13 is provided on the outer face thereof. The axes of the recesses 10 and 13 are aligned with the axis of the opening 12. A zig-zag tongue and groove connection is provided between the arms 5, and the sections B, as is clearly shown at 15 in Figures 1 and 2. The edges are held together by transversely extending bolts 16.

A bolt 17 extends through each opening 12 and the corresponding bore 7, and has its head 18 situated in the recess 13, and a nut 19 engaged on the end of the bolt is situated in the recess 8.

From the above detailed description it will be seen that this sectional knock-down crank shaft may be provided on its bearing portions 6 with roller bearings of any suitable structure, such for example as the well known Timken roller bearing. The parts when assembled will be exceedingly strong, and yet they may be disassembled rather quickly for renewing the roller bearings and may then be readily and quickly assembled. It is thought that the construction, utility, and advantages of the invention will now be clearly understood without a more detailed description thereof. It is apparent that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

In a crank shaft, a crank segment including two parallel spaced portions, each portion comprising a pair of sections disposed in end to end relation, one section being provided with a bearing and the other section being provided with a recess for receiving a bearing, a bolt passing through the bearing and the recess for holding the portions assembled, the abutting edges of the sections being V-shaped in formation, one having a ridge and the other a groove for the reception of said ridge, and bolts passing transversely through the sections at an angle to the intermediate portion of the V-shaped edges therethrough for securing the sections together.

In testimony whereof I affix my signature.

OLE W. THOMPSON.